United States Patent [19]

Koshiishi et al.

[11] Patent Number: 5,097,187

[45] Date of Patent: Mar. 17, 1992

[54] MOTOR CONTROL APPARATUS FOR CONTROLLING MOTOR FOR SELECTIVELY DRIVING TWO MECHANISMS

[75] Inventors: Takaho Koshiishi, Tokyo; Tetsuya Kagawa, Zama, both of Japan

[73] Assignee: Ricoh Company, Ltd., Tokyo, Japan

[21] Appl. No.: 667,486

[22] Filed: Mar. 11, 1991

[30] Foreign Application Priority Data

Mar. 12, 1990 [JP] Japan ................................ 2-58098

[51] Int. Cl.⁵ .......................................... H02F 7/00
[52] U.S. Cl. ................................. 318/280; 318/65
[58] Field of Search ............ 271/8.1, 9, 21, 109, 271/114, 138, 227, 243, 253, 254, 256, 270, 155; 358/409, 412, 413, 404, 467, 468; 318/280–286, 685, 696, 592, 596, 632, 603, 611, 625, 664, 665, 668, 471, 705, 432, 256, 440, 34, 35, 40, 47, 50, 630, 54, 65, 439, 632; 400/616, 618, 636

[56] References Cited

U.S. PATENT DOCUMENTS

| | | | |
|---|---|---|---|
| 3,886,424 | 5/1975 | Hoshina et al. | 318/630 |
| 3,940,675 | 2/1976 | Schroeder | 318/603 |
| 4,142,209 | 2/1979 | Hedland et al. | 365/234 X |
| 4,743,975 | 5/1988 | Ijuin | 358/467 X |
| 4,885,449 | 12/1989 | Suzuki et al. | 318/632 X |
| 4,922,171 | 5/1990 | Ohi | 318/471 X |

*Primary Examiner*—William M. Shoop, Jr.
*Assistant Examiner*—A. Jonathan Wysocki
*Attorney, Agent, or Firm*—Oblon, Spivak, McClelland, Maier & Neustadt

[57] ABSTRACT

A motor control apparatus for controlling a motor which selectively drives a first mechanism for moving a first object and a second mechanism for moving a second object. Both the first and second mechanisms having a backlash which occurs when the motor is reversed. The first mechanism moves the first object when the motor is rotated in a first direction and the second mechanism moves the second object when the motor is rotated in a second direction. The motor control apparatus includes a driving controller for rotating the motor at a predetermined angle in either the first direction or the second direction based on a predetermined instruction, a determining block for determining whether or not the motor is reversed, and a compensation block for compensating the angle at which the driving controller should rotate the motor so that an angle corresponding to the backlash is included in the angle at which the driving controller should rotate the motor.

11 Claims, 4 Drawing Sheets

MOTOR CONTROL APPARATUS FOR CONTROLLING MOTOR FOR SELECTIVELY DRIVING TWO MECHANISMS

BACKGROUND OF THE INVENTION

The present invention generally relates to a motor control apparatus for controlling a motor for selectively driving two mechanisms, and more particularly to a motor control apparatus for controlling a motor for selectively driving two mechanisms in which both of the mechanisms can be accurately driven.

In general, a facsimile set has a reading system for reading a image formed on a document sheet and a recording system for recording received image information on a recording sheet, and both the reading system and the recording system respectively have a driving motor for driving a mechanism for feeding the document sheet or the recording sheet. However, in a small sized facsimile set, such as a note-sized facsimile set, if both the reading system and the recording system have a motor, it is difficult to make a body thereof small and the cost thereof increases.

Thus, a facsimile set in which both the reading system and the recording system are driven by one motor has been developed for practical use. This type of facsimile set has, for example, a driving system as shown in FIG. 1.

Referring to FIG. 1, the reading system has a feed roller 3 for feeding a document sheet 2 and a one way clutch 4. The feed roller 3 presses the document sheet 2 on the surface of a contract type optical sensor unit 1 and feeds the document sheet 2 in a feeding direction indicated by an arrow. The one way clutch 4 having a gear 4a is mounted on a shaft 3a of the feed roller 3. The one way clutch 4 transmits a driving force to the shaft 3a of the feeding roller 3 so that the feeding roller 3 is rotated in only a counterclockwise direction (CCW). When the feeding roller 3 is rotated in the counterclockwise direction (CCW), the document sheet 2 is fed in the feeding direction by the feeding roller 3. The recording system has a feed roller 7 for feeding a thermal recording sheet 6 and a one way clutch 8. The feed roller 7 presses the thermal recording sheet 6 on a thermal head unit 5 and feeds the thermal recording sheet 5 in a feeding direction indicated by an arrow. The one way clutch 8 having a gear 8a is mounted on a shaft 7a of the feed roller 7. The one way clutch 8 transmits a driving force to the shaft 7a of the feed roller 7 so that the feed roller 7 is rotated in only a counterclockwise direction (CCW). When the feed roller 7 is rotated in the counterclockwise direction (CCW), the thermal recording sheet 6 is fed in the feeding direction.

A stepping motor 9 can be rotated in both the clockwise direction (CW) and the counterclockwise direction (CCW). A gear 10 is mounted on a shaft 9a of the stepping motor 9, and the gear 10 engages with a main gear 11. An intermediate gear 12 is provided between the main gear 11 and the gear 4a of the one way clutch 4 and engages with both the gears 11 and 4a. The gear 8a of the one way clutch 8 directly engages with the main gear 11.

In addition, a document sensor 13 for detecting the document sheet 2 which is supplied to the contact type optical sensor unit 1 is provided close to the contact type optical sensor unit 1.

In the above driving system, when the stepping motor 9 is rotated in the clockwise direction (CW), the gear 10 is rotated in the same direction (CW), the main gear 11 is rotated in the counterclockwise direction (CCW) and the intermediate gear 12 is rotated in the clockwise direction (CW). Then, the gear 4a of the one way clutch 4 is rotated in the counterclockwise direction (CCW), so that the one way clutch 4 transmits the driving force based on the rotation of the gear 4a in the counterclockwise direction (CCW) to the shaft 3a of the feed roller 3. Therefore, the feed roller 3a feeds the document sheet 2 in the feeding direction. At this time, the gear 8a of the one way clutch 8 is rotated by the main gear 11 in the clockwise direction (CW), so that the one way clutch 8 does not transmit the driving force based on the rotation of the gear 8a in the clockwise direction (CW) to the shaft 7a of the feed roller 7. Therefore, the feed roller 7 is not rotated and the thermal recording sheet 5 is not fed.

On the other hand, when the stepping motor 9 is rotated in the counterclockwise direction (CCW), the gear 10 is rotated in the counterclockwise direction (CCW), the main gear 11 is rotated in the clockwise direction (CW) and the gear 8a of the one way clutch 8 is rotated in the counterclockwise direction (CCW), so that the one way clutch 8 transmits the driving force based on the rotation of the gear 8a in the counterclockwise direction (CCW) to the shaft 7a of the feed roller 7. Therefore, the feed roller 7 feeds the thermal recording sheet 5 in the feeding direction. At this time, the intermediate gear 12 engaging with the main gear 11 is rotated in the counterclockwise direction (CCW), so that the gear 4a of the one way clutch 4 is rotated in the clockwise direction (CW). Therefore, the one way clutch 4 does not transmit the driving force based on the rotation of the gear 4a in the clockwise direction (CW), so that the document sheet 2 is not fed.

In the above facsimile set, when the stepping motor 9 is rotated in the clockwise direction (CW), only the feed roller 3 for feeding the document sheet 2 is driven. On the other hand, when the stepping motor 9 is rotated in the counterclockwise direction (CCW), only the feed roller 7 for feeding the thermal recording sheet 6 is driven.

Accordingly, in this facsimile set, the stepping motor 9 can selectively drive the feed roller 4 for feeding the document sheet 2 and the feed roller 7 for feeding the thermal recording sheet 5, so that it is possible to make the driving mechanism in both the reading system and the recording system simple and to decrease the cost of the facsimile set.

However, the conventional facsimile set described above has the following disadvantage.

For example, when the stepping motor 9 is rotated in the counterclockwise direction (CCW), a lower side surface of each gear tooth of the gear 10 provided on the stepping motor 9 and an upper side surface of each corresponding gear tooth of the main gear 11 are in contact with each other so that there is a gap between an upper side surface of each gear tooth of the gear 10 and a lower side surface of each corresponding gear tooth of the main gear 11. A backlash caused by this gap occurs between the gear 10 and the main gear 11. Thus, when the stepping motor 9 is reversed, from the counterclockwise direction (CCW) to the clockwise direction (CW) or from the clockwise direction (CW) to the counterclockwise direction (CCW), the driving force can not be transmitted from the gear 10 provided on the stepping motor 9 to the main gear 11 until the stepping motor 9 is rotated at an angle corresponding to the backlash. The backlash is also generated between other pairs of gears, such as main gear 11 and the intermediate gear 12, the intermediate gear 12 and the gear 4a of the one way clutch 4, and the main gear 11 and the gear 8a of the one way clutch 8, which engage with each other. As a result, when the stepping motor 9 is reversed, the stepping motor 9 is idled at an angle corresponding to the backlash. When the stepping motor 9 is idled, either the feed roller 3 for feeding the document sheet 2 or the feed roller 7 for feeding the thermal recording sheet is not rotated.

A controller controls the stepping motor 9 so that the stepping motor 9 is driven in steps corresponding to the length in which either the document sheet 2 or the thermal recording sheet 5 should be fed. For example, in a case where the length which the document sheet 2 should be fed is constant, the stepping motor 9 is driven in constant steps corresponding to the above length without regard to whether or not the stepping motor 9 is reversed. Therefore, for example, in a case where image information on the document sheet 2 is transmitted immediately after received image information is recorded on the thermal recording sheet 5, the stepping motor 9 is idled at an angle corresponding to the backlash, so that the length in which the document sheet 2 is actually fed decreases. Thus, there is a case where the document sheet 2 can not be correctly read by the contact type optical sensor 1.

In general, in a case where one motor selectively drives any two mechanisms by controlling the rotating direction of the motor, there is the same disadvantage as the above case involving the above described two mechanism.

SUMMARY OF THE INVENTION

Accordingly, a general object of the present invention is to provide a novel and useful motor control apparatus for controlling a motor for selectively driving two mechanisms in which the disadvantage of the aforementioned prior art is eliminated.

A more specific object of the present invention is to provide a motor control apparatus in which a mechanism engaging with the motor can be accurately driven even when the motor is reversed.

The above objects of the present invention are achieved by a motor control apparatus for controlling a motor which selectively drives a first mechanism for moving a first object and a second mechanism for moving a second object, both the first and second mechanisms having a backlash which occurs when the motor is reversed, wherein the first mechanism moves the first object when the motor is rotated in a first direction and the second mechanism moves the second object when the motor is rotated in a second direction, the motor control apparatus comprising: driving control means for rotating the motor at a predetermined angle in either the first direction or the second direction based on a predetermined instruction; determining means for determining whether or not the motor is reversed; and compensation means, coupled to the driving control means and the determining means, for compensating the angle at which the driving control means should rotate the motor so that an angle corresponding to the backlash is included in the angle at which the driving control means should rotate the motor.

Another object of the present invention is to provide a motor control apparatus in which a mechanism engaging with the motor can be accurately driven even immediately after a power supply of the motor is turned on.

The above object of the present invention is also achieved by a motor control apparatus for controlling a motor which selectively drives a first mechanism and a second mechanism, the first mechanism having a first feed roller for feeding a first sheet and a first transmission mechanism for transmitting a rotation of the motor to the first roller, the second mechanism having a second feed roller for feeding a second sheet and a second transmission mechanism for transmitting a rotation of the motor to the second roller, both the first and second mechanisms having a backlash which occurs when each of the corresponding first and second mechanisms is reversed, wherein the first feed roller feeds a first sheet when the motor is rotated in a first direction and the second feed roller feeds a second sheet when the motor is rotated in a second direction, the motor control apparatus comprising: driving control means for rotating the motor at a predetermined angle in either the first direction or the second direction based on a predetermined instruction; determining means for determining whether or not the first sheet which has been located on the first roller is removed from the first roller by reversing the first roller when a power supply for supplying a power to the motor is turned on; and initial driving control means for rotating the motor at an angle corresponding to the backlash in the first direction when the determining means determines that the first sheet is removed from the first roller.

Additional objects, features and advantages of the present invention will become apparent from the following detailed description when read in conjunction with the accompanying drawings.

DESCRIPTION OF THE PREFERRED EMBODIMENTS

Figure 3:
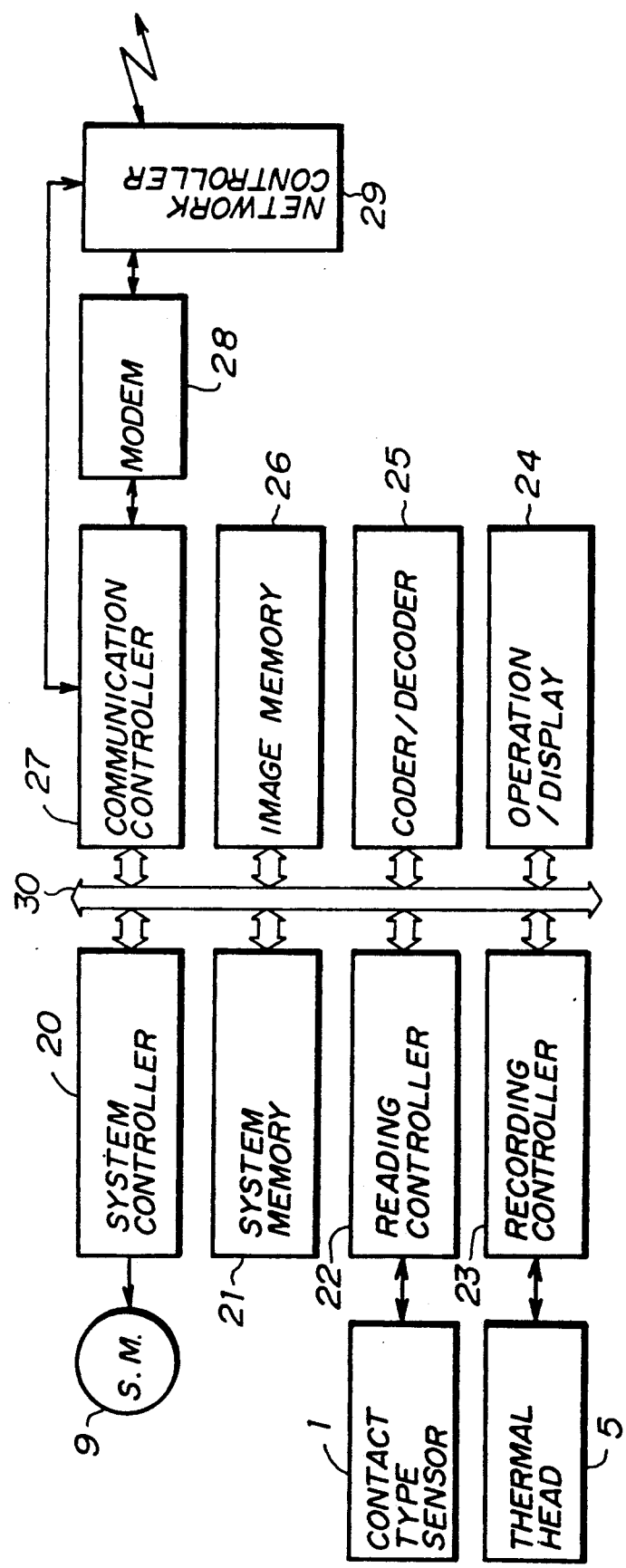
FIG. 3 is a block diagram illustrating a facsimile set according to an embodiment of the present invention.
Figure 4:
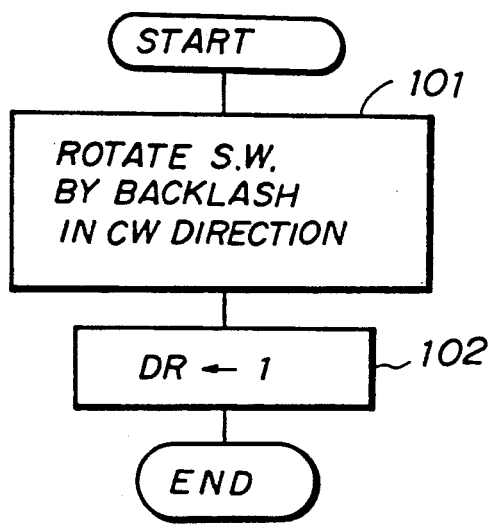
FIGS. 4, 5, 6 and 7 are flow chars illustrating processes for controlling the stepping motor in the facsimile set shown in FIG. 3.
Figure 5:
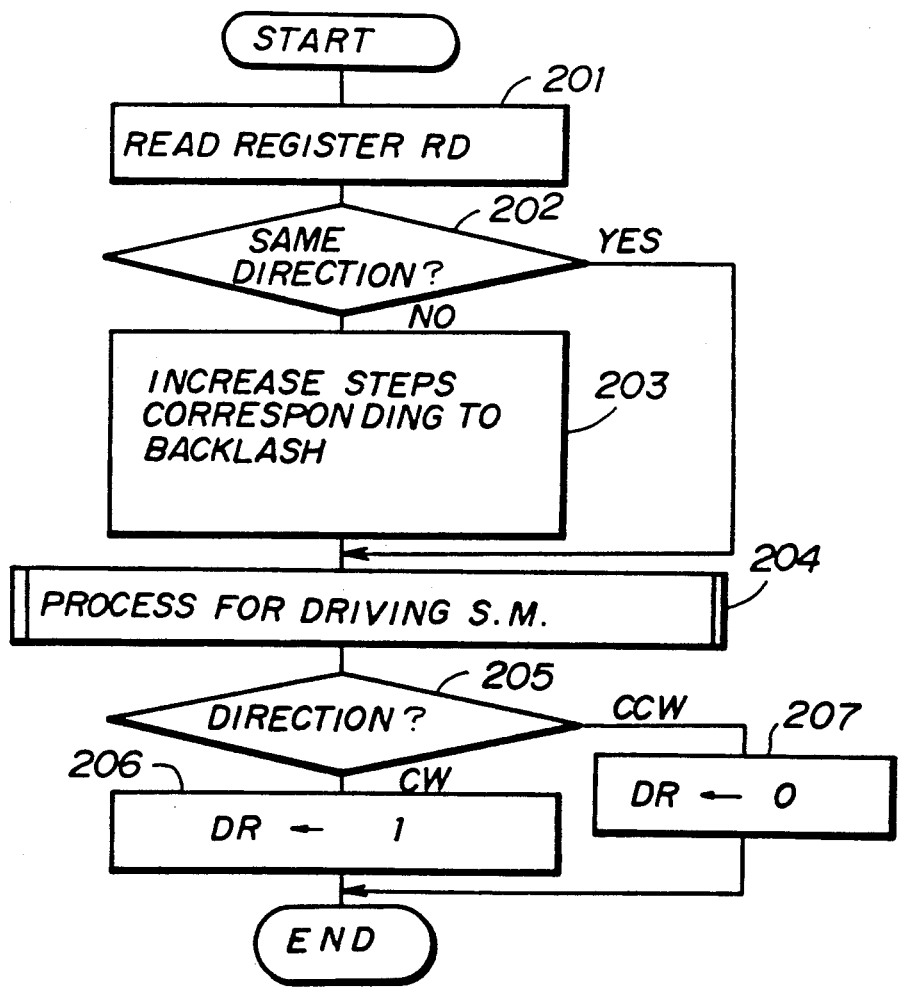

A description will now be give of a first embodiment of the present invention with reference to FIGS. 3, 4 and 5.

Figure 1:
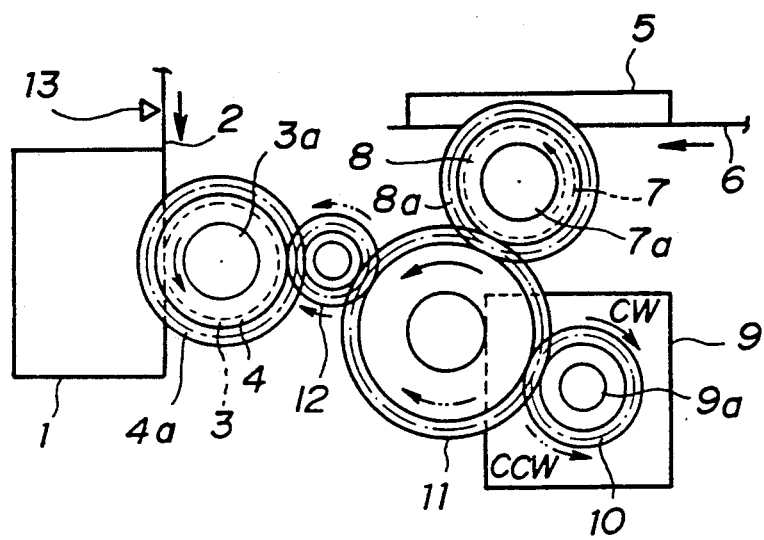
FIG. 1 is a diagram illustrating a driving mechanism for driving a reading system and a recording system in a facsimile set.
Figure 2:
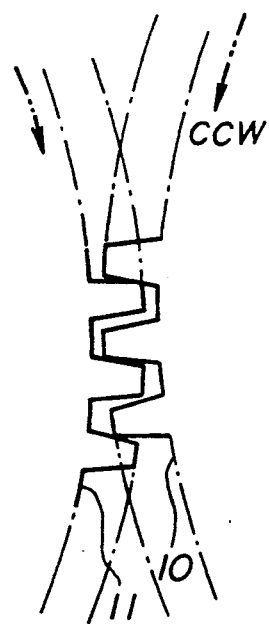
FIG. 2 is a diagram illustrating a backlash between two gears.

FIG. 3 shows the basic structure of a facsimile set according to the first embodiment of the present invention. This facsimile set has a driving mechanism for driving a reading system and a recording system, which driving mechanism has the same structure as that shown in FIG. 1. In FIG. 3, those parts which are the same as those shown in FIG. 1 are given the same reference numbers.

Referring to FIG. 3, a system controller 20 controls various operations in this facsimile set, and also controls the stepping motor 9. A system memory 21 stores control programs which are carried out by the system controller 20, various constant data and the like. A working area of the system controller 20 is formed on the system memory 21. A reading controller 22 cooperates with the system controller 20 to control the contact type optical sensor 1 so that images formed on the document sheet are read via the contact type optical sensor 1 at a predetermined resolution. A recording controller 23 cooperates with the system controller 21 to control thermal head 5 for recording images on the thermal recording sheet 6 by the line so that the images are recorded on the thermal recording sheet 6 at a predetermined resolution.

An operation/display unit 24 has various operation keys and a display panel and is used for inputting various instructions and for displaying various items of information. A coder/decoder unit 25 codes image signals obtained by a scanner (including the contract type optical sensor 1) and decodes the coded image information into original image signals. An image memory 26 stores decoded image signals and coded image information. A communication controller 27 carries out a predetermined process in accordance with a facsimile transmission control procedure. A modem 28 carries out modulation and demodulation processes which are required to transmit and receive digital data via an analog transmission line, such as a telephone line. A network controller 29 connects this facsimile set to the telephone line and disconnects this facsimile set from the telephone line, in accordance with a predetermined procedure.

The system controller 20, the system memory 21, the reading controller 22, the recording controller 23, the operation/display unit 24, the coder/decoder unit 25, the image memory 26 and the communication controller 27 are coupled to each other by a system bus 30, and communicate information to each other via the system bus 30.

This facsimile set transmits and receives image information via the telephone line in accordance with a predetermined procedure in the same manner as a conventional facsimile set. In this facsimile set, the stepping motor 9 for feeding the document sheet 2 and the thermal recording sheet 5 is controlled as follows.

When a power supply of this facsimile set is turned on, a process included in initial processes, which should be carried out when the power supply is turned on, is carried out as shown in FIG. 4. That is, step 101 makes the stepping motor 9 rotate in the clockwise direction (CW). In step 101, a driving signal for driving the stepping motor 9 the number of steps corresponding to the backlash in the driving mechanism of the reading system in the clockwise direction (CW) is supplied to the stepping motor 9 so that the stepping motor 9 is rotated at an angle corresponding to the backlash in the clockwise direction (CW). Then step 102 sets a direction bit "1" in a register DR. The direction bit "1" set in the register DR is stored in the system memory 21. The direction bit "1" denotes the clockwise direction (CW) and a direction bit "0" denotes the counterclockwise direction (CCW).

As has been described above, the stepping motor 9 is rotated at the angle corresponding to the backlash in the driving mechanism in the clockwise direction when the power supply of this facsimile is turned on. Therefore, the driving mechanism of the reading system is maintained in a state where the backlash with respect to the clockwise direction (CW) is eliminated. Also, the direction in which the stepping motor 9 has been rotated in the preceding process is stored in the system memory 21.

After that, the system controller 20 cooperates with the reading controller 22 to carry out a process for reading images formed on the document sheet 2 and with the recording controller 23 in carrying out a process for recording images on the thermal recording sheet 5. In particular, the system controller 20 controls the stepping motor 9 so that the stepping motor 9 is driven in synchronism with an operation for inputting image signals or with an operation for outputting image signals. When the controller 20 controls the stepping motor 9, a process is carried out in accordance with the flow chart shown in FIG. 5.

Referring to FIG. 5, step 201 reads the direction bit in the register DR, and step 202 determines whether or not a direction in which the stepping motor 9 should be rotated is the same as the direction denoted by the direction bit ("1" or "0") in the register DR. When the result in step 202 is NO, the stepping motor 9 must be reversed. In a case where the stepping motor 9 is reversed, the backlash occurs in the driving mechanism, so that step 203 increases the number of steps which the stepping motor 9 should be driven, by the number of steps corresponding to the backlash in the driving mechanism. Then step 204 carries out a predetermined process for rotating the stepping motor 9 based on the increased number of steps obtained by step 203. For example, in a case where the direction bit "0" denoting the counterclockwise direction (CCW) has been previously set in the register RD, when an instruction for reading the image information formed on the document sheet 2 (transmitting the image information) is performed, the stepping motor 9 should be reversed. In this case, the the number of steps, corresponding to the length in which the document sheet 2 is fed to the contact type optical sensor 1, is increased by the number of steps corresponding to the backlash in the driving mechanism of the reading system. Then the stepping motor 9 is driven the increased number of steps in the clockwise direction (CW) opposite to the counterclockwise direction (CCW) denoted by the direction bit "0" in the register RD. On the other hand, for example, in a case where the direction bit "1" denoting the clockwise direction (CW) has been previously set in the register RD, when an instruction for recording the image information which is received via the telephone line on the thermal recording sheet 6 (receiving the image information) is performed, the stepping motor 9 should be reversed. In this case, the number of steps, corresponding to the length in which the thermal recording sheet 6 is fed by the feed roller 7, is increased by the number of steps corresponding to the backlash in the driving mechanism of the recording system. Then the stepping motor 9 is driven the increased number of steps in the counterclockwise direction (CW) opposite to the clockwise direction (CW) denoted by the direction bit "1" in the register RD.

When the result in step 202 is YES, the direction in which the stepping motor 9 has been previously rotated is the same as a direction in which the stepping motor should be rotated at this time. Thus, there is no backlash with respect to the direction in which the stepping motor 9 should be rotated at this time. As a result, step 203 is omitted and the process proceeds to step 204.

When the process for driving the stepping motor 9 in step 204 is completed, step 205 determines whether the stepping motor 9 was rotated in the clockwise direction (CW) or the counterclockwise direction (CCW). When the stepping motor 9 was rotated in the clockwise direction (CW) in step 204 so that the image information formed on the document sheet 2 was read, step 206 sets the direction bit "1" in the resister RD. Then, the direction bit stored in the system memory 21 is updated to "1" which denotes the clockwise direction (CW). When the stepping motor 9 was rotated in the counterclockwise direction (CCW) in step 204, step 206 sets the direction bit "0" in the resister RD. Then, the direction bit stored in the system memory 21 is updated to "0" which denotes the counterclockwise direction (CCW).

That is, the direction bit stored in the system memory 21 usually denotes the direction in which the stepping motor has been rotated in the immediately preceding process.

According to the first embodiment, the system memory 21 stores the direction bit denoting the direction in which the stepping motor 9 was rotated. Also, when the stepping motor 9 must be reversed, the number of steps the stepping motor 9 is driven is increased by the number of steps corresponding to the backlash in the driving mechanism so that the disadvantage caused by the backlash in the driving mechanism is eliminated. Therefore, in a case where the image information transmits after the image information is received, when the document sheet 2 is fed to the contact type optical sensor 1, the number of steps the stepping motor 9 is driven in the clockwise direction is increased by the number of steps corresponding to the backlash in the driving mechanism of the reading system. Thus, it is possible to accurately feed the document sheet 2 to the contact type optical sensor 1.

In addition, when the power supply of the facsimile set is turned on, the stepping motor 9 is rotated in the clockwise direction (CW) to drive the feed roller 3 for feeding the document sheet 2 and the direction bit "1" denoting the clockwise direction (CW) is stored in the system memory 21. As a result, either the document sheet 2 or the thermal recording sheet 6 can be accurately fed immediately after the power supply of the facsimile set is turned on.

When the power supply of the facsimile set is turned on, the stepping motor 9 is also capable of being rotated in the counterclockwise direction (CCW). But, in this case, the thermal recording sheet 6 sandwiched between the thermal head 5 and the feed roller 7 is fed by the feed roller 7.

In the above embodiment, the system controller 20 controls the stepping motor 9. However, the reading controller 22 can also control the stepping motor 9 when the image information is read from the document sheet 2, and the recording controller 23 can also control the stepping motor 9 when the image information is recorded on the thermal recording sheet 6.

In this facsimile, if the document sheet 2 is sandwiched between the contact type optical sensor 1 and the feed roller 3 when the power supply is turned on, the system controller 21 determines that a paper jam is generated, so that predetermined error information is displayed in the operation/display unit 24. In this case, an operator pulls the document sheet 2 to remove it from between the contact type optical sensor 1 and the feed roller 3, and then the operator sets the document sheet 2 on a feed tray so that the document sheet 2 is regularly fed again. When the operator pulls the document sheet 2 to remove the document sheet 2 from between the contact type optical sensor 1 and the feed roller 3, the feed roller 3 is reversed in the clockwise direction (CW) so that the backlash in the driving mechanism of the reading system with respect to the direction in which the document sheet 2 is fed, is generated. In this condition, when the operation for reading the document sheet 2 starts, the backlash affects the feeding of the document sheet 2 so that the document sheet 2 can not be accurately read.

The system controller 20 carries out the following process according to a second embodiment to eliminate the above disadvantage.

Figure 6:
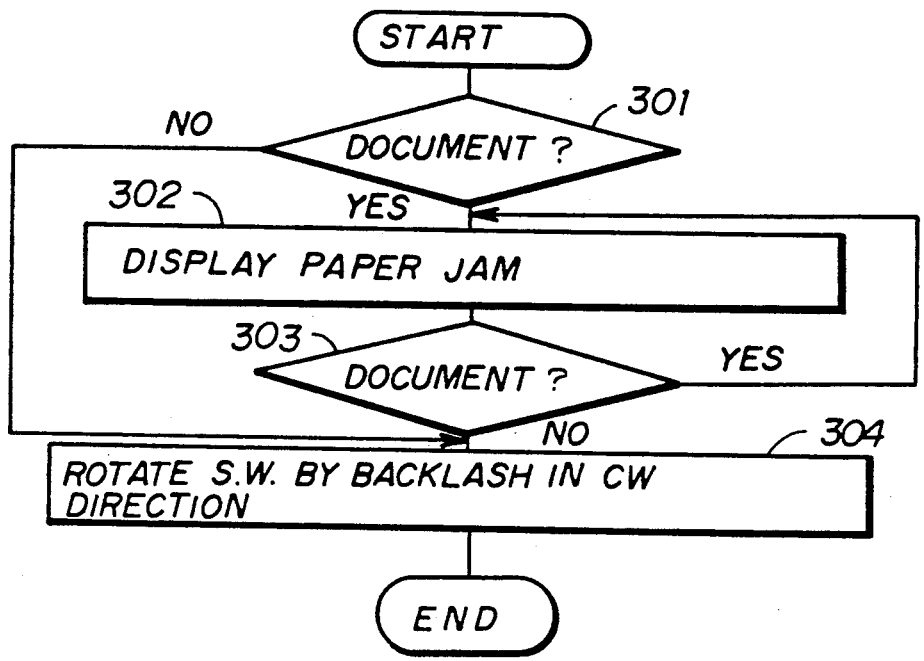

Referring to FIG. 6, when the power supply is turned on, step 301 determines whether or not the document sheet 2 was detected by the document sensor 13. When the result in step 301 is YES, step 302 makes the operate/display 24 display an error information representing that a paper jam was generated in this facsimile set. Then step 303 determines whether or not the document sheet 2 is detected by the document sensor 13. In a case where the document sheet 2 is put between the contact type optical sensor 1 and the feed roller 3, processes in step 302 and step 303 are sequentially repeated. When the operator who recognizes the error information displayed on the operation/display unit 24 pulls the document sheet 2 so that the recording sheet 2 is removed from between the contact type optical sensor 1 and the feed roller 3, the result in step 303 becomes NO. When the result in step 303 is NO, step 304 makes the stepping motor 9 be driven the number of steps corresponding to the backlash in the driving mechanism of the reading system in the clockwise direction (CW). Thus, the stepping motor 9 is maintained in a condition in which there is no backlash with respect to the clockwise direction (CW).

When the result in step 301 is NO, the process immediately proceeds to step 304 so that the stepping motor 9 is automatically driven the number of steps corresponding to the backlash in the clockwise direction (CW) when the power supply is turned on.

In the second embodiment, the stepping motor 9 is driven the number of steps corresponding to the backlash in the driving mechanism of the reading system in the clockwise direction (CW) when the power supply of the facsimile set is turned on. Therefore, when the image information formed on the document sheet 2 is read immediately after the power supply is turned on, the feed roller 3 for feeding the document sheet 2 can be rotated without idling, based on the backlash, of the stepping motor 9.

Figure 7:
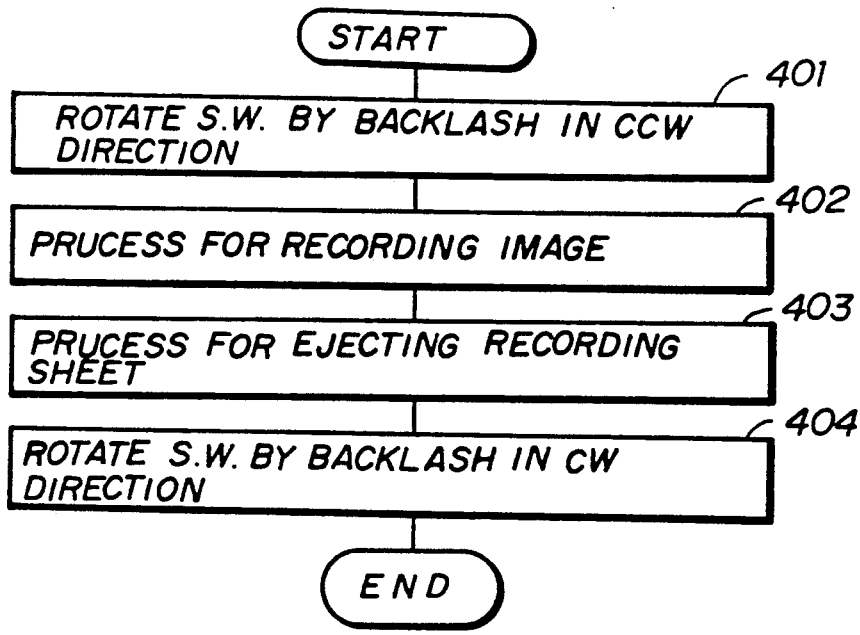

In this case, when the image information is recorded on the thermal recording sheet 6 immediately after the power supply is turned on, the process in accordance with the flow chart shown in FIG. 7 is carried out.

Referring to FIG. 7, step 401 makes the stepping motor be driven the number of steps corresponding to the backlash in the driving mechanism of the recording system in the counterclockwise direction (CCW). Then step 402 carries out a process for recording an image on the thermal recording sheet 6. That is, the thermal head 5 successively records an image corresponding to the image information on the recording sheet 6 which is fed by the feed roller 7. When the process for recording the image on the thermal recording sheet is completed, step 403 carries out a process for ejecting the thermal recording sheet on which the image is formed. Then, step 404 makes the stepping motor 9 be driven the number of steps corresponding to the backlash in the driving mechanism of the reading system in the clockwise direction (CW).

According to the process as shown in FIG. 7, the feed roller 7 for feeding the thermal recording sheet 6 starts to be rotated after the backlash with respect to the counterclockwise direction (CCW) is eliminated, so that the image can be accurately formed on the thermal recording sheet 6. In addition, the backlash in the driving mechanism of the reading system is eliminated immediately after the process for recording the image on the thermal recording sheet 6. Therefore, the rotation of the feed roller 3 for feeding the document sheet 2 can be started in a condition in which there is no backlash in the driving mechanism of the reading system even if the process for reading the information on the document sheet 2 starts immediately after the image is recorded on the thermal recording sheet 6.

According to the present invention, the motor is controlled so that the backlash in the driving system is eliminated, so that the mechanism which engages with the motor can be accurately driven even when the motor is reversed.

The present invention is not limited to the aforementioned embodiments, and variations and modifications may be made without departing from the scope of the claimed invention. For example, the present invention can be applied to a general system having two mechanism which are selectively driven by one motor.

What is claimed is:

1. A motor control apparatus for controlling a motor which selectively drives a first mechanism for moving a first object and a second mechanism for moving a second object, each of the first and second mechanisms having a backlash which occurs when said motor is reversed, wherein said first mechanism moves the first object when said motor is rotated in a first direction and said second mechanism moves the second object when said motor is rotated in a second direction, said motor control apparatus comprising:

driving control means for rotating said motor at a predetermined angle in either the first direction or the second direction based on a predetermined instruction;

storage means for storing direction information denoting a direction in which said driving control means rotates said motor in an operation;

determining means, coupled to said storage means, for determining whether or not a direction in which said driving control means rotates said motor in a present operation differs from a direction denoted by the direction information which has been stored in said storage means;

compensation means, coupled to said driving control means and said determining means, for compensating the angle at which said driving control means rotates said motor in the present operation so that an angle corresponding to the backlash is included in the angle at which said driving control means rotates said motor in the present operation when said determining means determines that a direction in which said driving control means rotates said motor in the present operation differs from a direction denoted by the direction information which has been stored in said storage means; and first initial control means, coupled to said motor, for initially rotating said motor at an angle corresponding to the backlash in the first direction when a power supply for supplying power to said motor is turned on; and second initial control means, coupled to said storage means and said initial driving means, for initially controlling said storage means so that said storage means stores initial direction information denoting the first direction when said initial driving control means initially rotates said motor.

2. A motor control apparatus as claimed in claim 1, wherein said motor is a stepping motor which is rotated at an angle corresponding to the number of steps supplied thereto.

3. A motor control apparatus as claimed in claim 2, wherein said driving control means has stepping control means for rotating said stepping motor at a predetermined number of steps in either the first direction or the second direction based on a predetermined instruction, and wherein said compensation means has stepping compensation means for compensating the number of steps at which said driving control means rotates said stepping motor so that a number of steps corresponding to the backlash is included in the number of steps at which said driving control means rotates said stepping motor.

4. A motor control apparatus as claimed in claim 1, wherein the first mechanism is a mechanism of a reading system in a facsimile set, and the second mechanism is a mechanism of a recording system in said facsimile set, said mechanism of the reading system feeding a document sheet from which image information thereon is read by an optical sensor, said mechanism of the recording system feeding a recording sheet on which image information received by said facsimile set is recorded by a recording head.

5. A motor control apparatus for controlling a motor which selectively drives a first mechanism and a second mechanism, said first mechanism having a first feed roller for feeding a first sheet and a first transmission mechanism for transmitting rotation of said motor to said first roller, said second mechanism having a second feed roller for feeding a second sheet and a second transmission mechanism for transmitting rotation of said motor to said second roller, both the first and second mechanisms having backlash which occurs when each of the corresponding first and second mechanisms is reversed, wherein said first feed roller feeds the first sheet when said motor is rotated in a first direction and said second feed roller feeds the second sheet when said motor is rotated in a second direction, said motor control apparatus comprising:

driving control means for rotating said motor at a predetermined angle in either the first direction or the second direction based on a predetermined instruction;

determining means for determining whether or not the first sheet which has been located on the first roller is removed from the first roller by reversing the first roller when a power supply for supplying power to said motor is turned on; and initial driving control means for rotating said motor at an angle corresponding to the backlash in the first direction when said determining means determines that the first sheet is removed from the first roller.

6. A motor control apparatus as claimed in claim 5, wherein said determining means has a sensor for detecting the first sheet located on the first roller, so that said determining means determines that the first sheet is removed from the first roller when a state is changed from a first state where said sensor detects the first sheet located on the first roller to a second state where said sensor does not detect the first sheet.

7. A motor control apparatus as claimed in claim 5, further comprising pre-processing means for rotating said motor at an angle corresponding to the backlash in the second direction before said driving control means rotates said motor at the predetermined angle in the second direction.

8. A motor control apparatus as claimed in claim 7, further comprising post-processing means for rotating said motor at an angle corresponding to the backlash in the first direction after a process in which said driving control means rotates said motor at the predetermined angle in the second direction is completed.

9. A motor control apparatus as claimed in claim 5, wherein said motor is a stepping motor which is rotated at an angle corresponding to the number of steps supplied thereto.

10. A motor control apparatus as claimed in claim 9, wherein said driving control means has stepping control means for rotating said stepping motor the predetermined number of steps in either the first direction or the second direction based on a predetermined instruction, and initial stepping control means for rotating said stepping motor the number of steps corresponding to the backlash in the first direction when said determining means determines that the first sheet is removed from the first roller.

11. A motor control apparatus as claimed in claim 5, wherein the first mechanism is a mechanism of a reading system in a facsimile set, and the second mechanism is a mechanism of a recording system in said facsimile set, the first roller in said mechanism of the reading system feeding a document sheet from which image information thereon is read by an optical sensor, the second roller in said mechanism of the recording system feeding a recording sheet on which image information received by said facsimile set is recorded by a recording head.

* * * * *